United States Patent [19]
Chen et al.

[11] 3,956,102
[45] May 11, 1976

[54] HYDRODEWAXING

[75] Inventors: Nai Yuen Chen, Titusville;
Bernard M. Gillespie, Pitman;
Henry R. Ireland, Woodbury;
Thomas R. Stein, Cherry Hill, all of N.J.

[73] Assignee: Mobil Oil Corporation, New York, N.Y.

[22] Filed: June 5, 1974

[21] Appl. No.: 476,493

[52] U.S. Cl. ............................... 208/93; 208/111; 208/141
[51] Int. Cl.² ............... C10G 13/00; C10G 41/00
[58] Field of Search ............... 208/93, 18, 111, 28

[56] References Cited
UNITED STATES PATENTS

| | | | |
|---|---|---|---|
| 3,431,194 | 3/1969 | Bartok et al. | 208/93 |
| 3,700,585 | 10/1972 | Chen et al. | 208/111 |
| 3,755,145 | 8/1973 | Orkin | 208/111 |

*Primary Examiner*—Herbert Levine
*Attorney, Agent, or Firm*—Charles A. Huggett; Vincent J. Frilette

[57] ABSTRACT

A method for the operation of a hydrodewaxing unit wherein a petroleum distillate is separated into two streams, one having a pour point of above about 30°F, and the other having a pour point of less than about 30°F., the 30°F plus pour point fraction is treated in a hydrodewaxing unit with a ZSM-5 type catalyst under hydroprocessing conditions while the 30°F. minus pour point portion is untreated and combined with the hydrodewaxed product. The process yields a net production of hydrogen, and exhibits excellent catalyst aging characteristics.

7 Claims, 3 Drawing Figures

POUR POINT BLENDING CHART
(Distillate Blends Only)

HYDRODEWAXING

BACKGROUND OF THE INVENTION

1. Field of the Invention

This invention deals with the hydrodewaxing of petroleum distillates thereby producing a treated product having an improved pour point. This invention deals with hydrodewaxing utilizing a ZSM5 type catalyst. More particularly, this invention relates to novel dewaxing processes carried out in the presence of crystalline zeolitic material and, more particularly, to the removal of straight-chain paraffins and slightly branched-chain paraffins from hydrocarbon feedstocks by selectively converting these materials from a mixture of the same with the other components generally found in hydrocarbon feedstocks.

2. Description of Prior Art

Hydrocarbon conversion processes utilizing crystalline zeolites and, in particular, aluminosilicate catalysts have been the subject of extensive investigation during recent years as is obvious from both the patent and scientific literature. Crystalline aluminosilicates have been found to be particularly effective for a wide variety of hydrocarbon conversion processes and have been described and claimed in many patents including U.S. Pats. Nos. 3,140,249; 3,140,252; 3,140,251; 3,140,253; and 3,271,418. Aside from serving as general catalysts in hydrocarbon conversion processes, it is also known that the molecular sieve properties of zeolites can be utilized to preferentially convert one molecular species from a mixture of the same with other species.

In a process of this type a zeolite molecular sieve is employed having catalytic activity within its internal pore structure and pore openings such that one component of a feed is capable of entering within the internal pore structure thereof and being converted to the substantial exclusion of another component which, because of its size, is incapable of entering within the pores of the zeolitic material. Shape selective catalytic conversion is also known in the art and is disclosed and claimed in U.S. Pats. Nos. 3,140,322; 3,379,640 and 3,395,094.

Although a wide variety of zeolitic materials and particularly crystalline aluminosilicates have been successfully employed in various catalytic conversion processes, nevertheless, these prior art processes, in general, fell into one or two main categories. In one type of conversion process a zeolite was employed which had a pore size sufficiently large to admit the vast majority of components normally found in a charge, i.e., these materials are referred to as large pore size molecular sieves and they are generally stated to have a pore size of from 6 to 13 angstroms and are represented by zeolites X, Y and L. The other type of aluminosilicate was one which had a pore size of approximately 5 angstrom units and it was utilized to preferentially act upon normal paraffins to the substantial exclusion of other molecular species. Thus, by way of considerable over-simplification until recently, there were only two types of aluminosilicates which were available for hydrocarbon processing—those which would admit only normal paraffins and those which would admit all components normally present in a hydrocarbon feed charge. See U.S. Pat. No. 3,700,585 and Canadian Patent 829,282.

It is well known in the art to form various lubricating oils, commonly referred to as lubes, from hydrocarbon fractions derived from petroleum crudes. With particular reference to the relatively waxy lube oils, a common procedure known in the art is to extract these hydrocarbon fractions with various solvents so as to give a raffinate of a desired high viscosity index, such material being resistant to changes in viscosity with changes in temperature and thus being useful under varying operating conditions. Moreover, it is particularly desired that the lube oil have a low pour point (A.S.T.M. Standard D97) so that it can be effectively used at low temperature conditions, since excessive thickening at low temperatures is often unacceptable. A related requirement for an acceptable lube oil is that it has a low cloud point, determined in accordance with the A.S.T.M. Cloud Point Test (A.S.T.M. D-2500), which fixes the temperature at which wax first starts to precipitate within the oil. Similarly, the freeze point (A.S.T.M. standard D-2836) and the Cold Filter Plugging Point (DIN 51428, SIS 155122, and AFNOR 549 Standards) are also further indicia of the fluidity of liquid hydrocarbons. Throughout the course of this specification it will be understood that when the term "pour point" is used, the comparable cloud point, freeze point or cold filter plugging point value might also be used as an equivalent term.

SUMMARY OF THE INVENTION

There has recently been discovered a certain novel class of crystalline aluminosilicate zeolites which have been shown to have most unusual properties. One member of this class of zeolites has been designated ZSM-5. This is also the name that has been given to this whole class of zeolites having this community of unusual properties.

The class of zeolites referred to herein as ZSM-5 type includes not only ZSM-5 type itself but also ZSM-11, ZSM-12, ZSM-21 and other similarly behaving materials such as TEA mordenite. Recently issued U.S. Pat. 3,702,886 describing and claiming ZSM-5 is incorporated herein by reference.

ZSM-11 generally corresponds to the empirical formula:

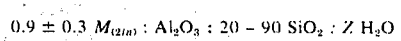

$$0.9 \pm 0.3\ M_{(2/n)} : Al_2O_3 : 20 - 90\ SiO_2 : Z\ H_2O$$

where $M$ is at least one cation, $n$ is the valence of $M$ and $Z$ is 6 to 12 in the "as produced" zeolite. The preferred $M$ is preferably sodium or tetraethyl ammonium. ZSM-11 is more particularly described in U.S. application Ser. No. 31,421 filed Apr. 23, 1970, and issued as U.S. Pat. No. 3,709,979 the entire contents of which are incorporated herein by reference.

ZSM-12 is described in U.S. Patent application Ser. No. 125,749 filed Mar. 18, 1971, and now Pat. No. 3,832,449, herein incorporated by reference.

In a preferred synthesized form, as described in U.S. application Ser. No. 358,192, May 7, 1973, and now abandoned, the ZSM-21 zeolite has a formula, in terms of mole ratios of oxides and in the anhydrous states, as follows:

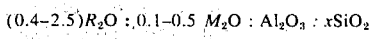

$$(0.4-2.5)R_2O : 0.1-0.5\ M_2O : Al_2O_3 : xSiO_2$$

wherein $R$ is an organic nitrogen containing cation, especially a cation derived from ethylenediamine, pyrrolidine or Z-(hydroxy-alkyl) trialkylammonium compounds, wherein alkyl is methyl, ethyl or a combination of the two, $M$ is an alkali metal, especially sodium, and $x$ is from greater than 10 to about 50.

Reference is made to U.S. Patent application Ser. No. 253,942 filed May 17, 1972, now U.S. Pat. No. 3,756,942, for a more complete description of the various specific catalysts in the ZSM-5 class and for methods of preparing such.

In general, zeolite molecular sieves have in the past been characterized as shape selective, that is, having pore openings so sized and shaped as to admit substantially only normal paraffins into their internal pore structure, or non-shape selective or large pored, that is having pore openings so sized and shaped as to admit substantially any configuration of organic compound into their internal pore structure. It has become usual in this art to refer to shape selective zeolites as those having pore openings of about 5 Angstrom units of less and to non-shape selective zeolites as those having pore openings of about 11 Angstrom units or more.

A method for the operation of a hydrodewaxing unit has been discovered wherein a petroleum distillate is separated into two streams, one having a pour point of above about 30°F., and the other having a pour point of less than about 30°F., the +30°F plus pour point fraction is treated in a hydrodewaxing unit with a ZSM-5 type catalyst under hydroprocessing conditions while the 30°F. minus pour point is untreated and combined with the hydrodewaxed product. The process yields a net production of hydrogen.

DESCRIPTION OF SPECIFIC EMBODIMENTS

Figure 1:
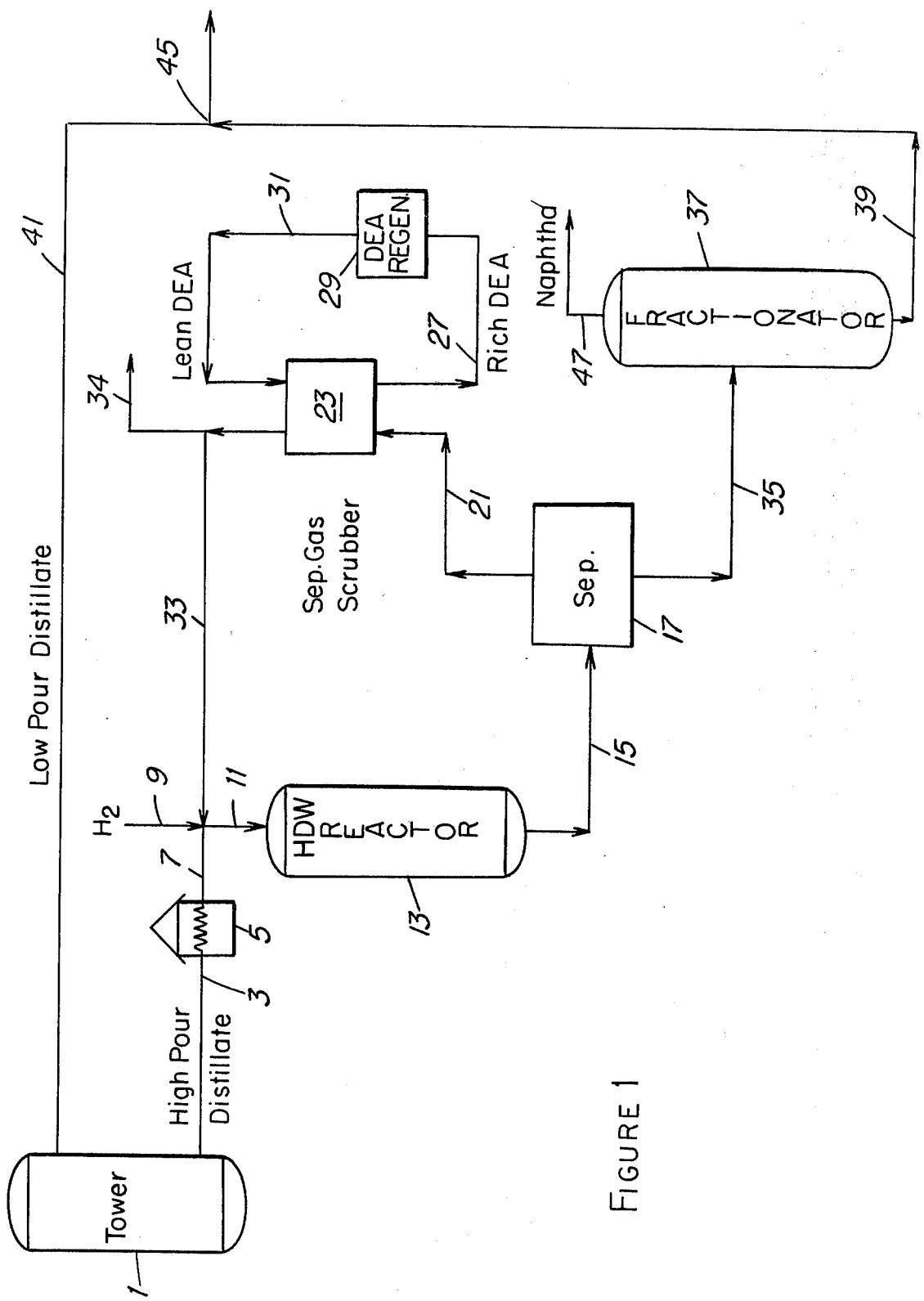
FIG. 1 is a schematic flow diagram.

Referring now to FIG. 1, a distillation is performed in a column 1, thereby producing a lower pour distillate having a pour point of about −20° to +30°F. and an end point of about 550° to 750°F. and a higher pour distillate having a pour point of about +30° to +100°F. and an end point of about 600° to 900°F. The low pour distillate is removed through a line 41; the high pour distillate through line 3.

The high pour distillate is heated in a furnace 5, and then exits via a line 7. In a preferred embodiment hydrogen from a line 9 is mixed with this heated high pour distillate, and the mixture transported through line 11 to a hydrodewaxing reactor 13 containing a ZSM-5 type catalyst. The treated high pour distillate is next transported to a separator 17 via a line 15. The separator 17 bottoms are sent to a fractionator 37 via a line 35. The fractionator 37 produces a naphtha cut which is drawn off by line 47, and a bottoms fraction which is combined with the low pour distillate at a point 45 via a line 39.

The separator overhead gas is sent to a gas scrubber 23 via a line 21. Lean DEA (diethanol amine) is contacted in the scrubber 23 with the separator overhead gas thereby removing gas impurities such as $H_2S$ (hydrogen sulfide). The rich, $H_2S$ laden, DEA exits the scrubber by means of a line 27 and is regenerated in a DEA regenerator 29 and recycled to the scrubber 23 through a line 31. A portion of the DEA treated separator overhead is recycled back to the hydrodewaxing reactor through line 33, while any excess is bled off via line 34.

In a preferred embodiment the fuel oil hydrotreated in the hydrodewaxing reactor has an end point of about 750°–900°F and the hydroprocessing conditions comprises a hydrogen pressure of about 100 to 3500 psig, a temperature of about 350° to 900°F, and a space velocity of about 0.1 to 25 LHSV. In a more preferred embodiment the conditions comprise a hydrogen pressure of about 100 to 1,500 psig, a temperature of about 500° to 850°F and a space velocity of about 0.5 to 10 LHSV.

The following are non limiting examples of the novelty of this invention.

EXAMPLES 1 – 18

A 470°F to 730°F. Arabian Light gas oil having properties as noted in Table 1 was passed over a ZSM-5 catalyst under the controlled process conditions which are also recited in Table 1. Product yields are given in Table 1 in both weight and volume percentages.

Examples 1–18 represent yield volumes and properties of the 470° – 730°F. chargestock as the ZSM-5 catalyst aged during the test. The process conditions of pressure, space velocity and gas recycle (make-up gas was typical reformer off gas — approximately 60 – 85% hydrogen, the volume being made up of light hydrocarbons) were held relatively constant, while the temperature was steadily increased in order to maintain a 330°F.+ pour point of 0°F. or less.

The ZSM-5 catalyst had been in service for about 167 days before being used for the experiments which follow. Prior to these experiments, it has been regenerated with oxygen twice to burn off coke deposits. In the example the total days on stream is shown as "DOS, Total"; and the days on stream after the second regeneration as "DOS, since Reg".

TABLE I

| Example No. | 470/730 Arab Light | 1 |
|---|---|---|
| Process conditions | | |
| Press. psig. | | 400 |
| LHSV, v/v/hr | | 1.38 |
| Gas Recyc.,SCF/B | | 1669 |
| Temp., °F. | | 574.6 |
| DOS, Total | | 168.9 |
| DOS, since Reg. | | 0.7 |
| $H_2$ Cons. SCF/B | | 258 |
| | | Yields: vol.%/wt.% |
| $C_1$ | | 0.04 |
| $C_2$ | | 0.07 |
| $C_3$ | | 1.66 |
| $C_4$'s | | 5.60/3.76 |
| $C_5$'s | | 4.59/3.37 |
| $C_6$-180°F. | | 5.05/3.87 |
| 180–330°F. | | 10.02/8.55 |
| 330°F.+ | | 77.28/78.85 |
| Total | | 102.54/100.45 |
| 330°F+ Gas Oil Properties | Charge Stock | |
| Gravity, °API | 32.8 | 27.4 |
| Pour Point, °F. | +30 | −50 |
| Example No. | 2 | 3 |
| Process conditions | | |
| Press. psig. | 400 | 400 |
| LHSV, v/v/hr | 1.47 | 1.44 |
| Gas Recyc.,SCF/B | 1581 | 1475 |
| Temp., °F. | 574 | 575 |
| DOS, Total | 169.9 | 170.9 |
| DOS, since Reg. | 1.7 | 2.7 |
| $H_2$ Cons. SCF/B | 322 | 10 |
| | Yields: vol.%/wt.% | |
| $C_1$ | 0.02 | 0.02 |
| $C_2$ | 0.09 | 0.04 |
| $C_3$ | 2.27 | 0.88 |
| $C_4$'s | 6.85/4.62 | 3.02/2.05 |
| $C_5$'s | 4.97/3.66 | 3.13/2.31 |
| $C_6$-180°F. | 4.71/3.67 | 3.56/2.75 |
| 180–330°F. | 8.50/7.30 | 7.64/6.48 |
| 330°F.+ | 77.17/78.90 | 84.49/85.42 |
| Total | 102.20/100.57 | 101.83/99.98 |

TABLE I-continued

| Example No. | 2 | 3 |
|---|---|---|
| 330°F+ Gas Oil Properties | | |
| Gravity, °API | 28.6 | 29.6 |
| Pour Point, °F. | −50 | −25 |

| Example No. | 4 | 5 |
|---|---|---|
| Process conditions | | |
| Press. psig. | 400 | 400 |
| LHSV, v/v/hr | 1.42 | 1.43 |
| Gas Recyc., SCF/B | 1551 | 1483 |
| Temp., °F. | 575.3 | 574.6 |
| DOS, Total | 171.9 | 172.9 |
| DOS, since Reg. | 3.7 | 4.7 |
| H₂ Cons. SCF/B | | 284 |
| Yields: vol.%/wt.% | | |
| C₁ | .01 | 0.03 |
| C₂ | .03 | 0.07 |
| C₃ | .78 | 1.33 |
| C₄'s | 3.67/2.49 | 3.73/2.53 |
| C₅'s | 4.56/3.37 | 3.74/2.78 |
| C₆-180°F. | 3.22/2.53 | 2.59/2.03 |
| 180-330°F. | 6.73/5.76 | 6.18/5.21 |
| 330°F.+ | 83.86/85.40 | 85.86/86.51 |
| Total | 102.04/100.30 | 102.10/100.51 |
| 330°F+ Gas Oil Properties | | |
| Gravity, °API | 30.0 | 30.4 |
| Pour Point, °F. | −10 | −20 |

| Example No. | 6 | 7 |
|---|---|---|
| Process conditions | | |
| Press. psig. | 400 | 400 |
| LHSV, v/v/hr | 1.42 | 1.49 |
| Gas Recyc., SCF/B | 1495 | 1349 |
| Temp., °F. | 574.6 | 581.2 |
| DOS, Total | 173.9 | 174.9 |
| DOS, since Reg. | 5.7 | 6.7 |
| H₂ Cons. SCF/B | 188 | 176 |
| Yields: vol.%/wt.% | | |
| C₁ | 0.02 | 0.01 |
| C₂ | 0.04 | 0.02 |
| C₃ | 0.75 | 0.35 |
| C₄'s | 2.66/1.81 | 2.35/1.60 |
| C₅'s | 3.28/2.43 | 3.43/2.54 |
| C₆-180°F. | 2.42/1.90 | 2.62/2.04 |
| 180-330°F. | 5.17/4.42 | 5.66/4.82 |
| 330°F.+ | 87.44/89.11 | 87.79/89.15 |
| Total | 100.97/100.34 | 101.85/100.31 |
| 330°F+ Gas Oil Properties | | |
| Gravity, °API | 30.7 | 30.4 |
| Pour Point, °F. | 0 | 0 |

| Example No. | 8 | 9 |
|---|---|---|
| Process conditions | | |
| Press. psig. | 400 | 400 |
| LHSV, v/v/hr | 1.46 | 1.49 |
| Gas Recyc., SCF/B | 1396 | 1378 |
| Temp., °F. | 600.2 | 600.2 |
| DOS, Total | 175.9 | 176.9 |
| DOS, since Reg. | 7.7 | 8.7 |
| H₂ Cons. SCF/B | 228 | 424 |
| Yields: vol.%/wt.% | | |
| C₁ | 0.01 | 0.01 |
| C₂ | 0.02 | 0.02 |
| C₃ | 0.52 | 0.62 |
| C₄'s | 3.42/2.33 | 3.73/2.55 |
| C₅'s | 4.59/3.41 | 4.94/3.68 |
| C₆-180°F. | 3.46/2.73 | 3.00/2.37 |
| 180-330°F. | 7.12/6.09 | 6.12/5.23 |
| 330°F.+ | 83.74/85.54 | 84.27/86.24 |
| Total | 102.33/100.41 | 102.06/100.75 |
| 330°F+ Gas Oil Properties | | |
| Gravity, °API | 29.6 | 29.9 |
| Pour Point, °F. | −20 | −10 |

| Example No. | 10 | 11 |
|---|---|---|
| Process conditions | | |
| Press. psig. | 400 | 400 |
| LHSV, v/v/hr | 1.45 | 1.45 |
| Gas Recyc., SCF/B | 1456 | 1530 |
| Temp., °F. | 619.9 | 623.1 |
| DOS, Total | 179.8 | 180.8 |
| DOS, since Reg. | 11.6 | 12.6 |
| H₂ Cons. SCF/B | 232 | 245 |
| Yields: vol.%/wt.% | | |
| C₁ | 0.01 | 0.01 |
| C₂ | 0.04 | 0.03 |
| C₃ | 1.06 | 0.64 |
| C₄'s | 4.32/2.95 | 3.59/2.45 |
| C₅'s | 5.40/4.02 | 4.91/3.65 |
| C₆-180°F. | 3.53/2.79 | 3.62/2.85 |
| 180-330°F. | 7.20/6.19 | 7.29/6.21 |
| 330°F.+ | 81.43/83.56 | 82.91/84.58 |
| Total | 101.89/100.41 | 102.32/100.44 |
| 330°F+ Gas Oil Properties | | |
| Gravity, °API | 29.5 | 29.5 |
| Pour Point, °F. | −20 | −20 |

| Example No. | 12 | 13 |
|---|---|---|
| Process conditions | | |
| Press. psig. | 400 | 400 |
| LHSV, v/v/hr | 1.42 | 1.46 |
| Gas Recyc., SCF/B | 1536 | 1481 |
| Temp., °F. | 634.8 | 634.7 |
| DOS, Total | 182.8 | 183.8 |
| DOS, since Reg. | 14.6 | 15.6 |
| H₂ Cons. SCF/B | 110 | 319 |
| Yields: vol.%/wt.% | | |
| C₁ | 0.00 | 0.01 |
| C₂ | 0.02 | 0.04 |
| C₃ | 0.51 | 0.87 |
| C₄'s | 3.39/2.32 | 3.83/2.61 |
| C₅'s | 5.09/3.79 | 5.00/3.73 |
| C₆-180°F. | 4.13/3.26 | 4.08/3.21 |
| 180-330°F. | 8.35/7.17 | 7.67/6.57 |
| 330°F.+ | 81.51/83.35 | 81.97/83.45 |
| Total | 102.47/100.22 | 102.55/100.56 |
| 330°F+ Gas Oil Properties | | |
| Gravity, °API | 29.4 | 29.5 |
| Pour Point, °F | −40 | −25 |

| Example No. | 14 | 15 |
|---|---|---|
| Process conditions | | |
| Press. psig. | 400 | 400 |
| LHSV, v/v/hr | 1.43 | 1.43 |
| Gas Recyc., SCF/B | 1459 | 1476 |
| Temp., °F. | 635 | 634.9 |
| DOS, Total | 185.8 | 187.8 |
| DOS, since Reg. | 17.6 | 19.6 |
| H₂ Cons. SCF/B | 191 | 248 |
| Yields: vol.%/wt.% | | |
| C₁ | .00 | 0.01 |
| C₂ | .04 | 0.02 |
| C₃ | .87 | 0.56 |
| C₄'s | 4.23/2.89 | 3.41/2.34 |
| C₅'s | 4.57/3.41 | 4.59/3.43 |
| C₆-180°F. | 3.92/3.08 | 3.77/2.98 |
| 180-330°F. | 6.68/5.68 | 6.39/5.47 |
| 330°F.+ | 83.00/84.42 | 84.01/85.66 |
| Total | 102.40/100.33 | 102.17/100.43 |
| 330°F+ Gas Oil Properties | | |
| Gravity, °API | 29.8 | 30.0 |
| Pour Point, °F. | −20 | −20 |

| Example No. | 16 | 17 |
|---|---|---|
| Process conditions | | |
| Press. psig. | 400 | 400 |
| LHSV, v/v/hr | 1.45 | 1.44 |
| Gas Recyc., SCF/B | 1493 | 1446 |
| Temp., °F. | 634.2 | 634.9 |
| DOS, Total | 189.8 | 191.8 |
| DOS, since Reg. | 21.6 | 23.6 |
| H₂ Cons. SCF/B | 250 | 65 |
| Yields: vol.%/wt.% | | |
| C₁ | 0.00 | 0.00 |
| C₂ | 0.02 | 0.02 |
| C₃ | 0.55 | 0.67 |
| C₄'s | 2.16/1.48 | 3.59/2.64 |
| C₅'s | 2.20/1.64 | 4.01/2.99 |

TABLE 1-continued

| Example No. | 16 | 17 |
|---|---|---|
| $C_6$-180°F. | 3.48/2.72 | 2.18/1.74 |
| 180–330°F. | 6.17/5.23 | 6.09/5.21 |
| 330°F.+ | 87.96/88.74 | 85.45/86.94 |
| Total | 101.97/100.44 | 101.33/100.11 |
| 330°F+ Gas Oil Properties | | |
| Gravity, °API | 30.3 | 30.5 |
| Pour Point, °F. | −10 | −5 |

| Example No. | 18 |
|---|---|
| Process conditions | |
| Press. psig. | 400 |
| LHSV, v/v/hr | 1.43 |
| Gas Recyc.,SCF/B | 1500 |
| Temp., °F. | 635.8 |
| DOS, Total | 193.8 |
| DOS, since Reg. | 25.6 |
| $H_2$ Cons. SCF/B | 237 |
| | Yields:vol.%/wt.% |
| $C_1$ | 0.00 |
| $C_2$ | 0.01 |
| $C_3$ | 0.42 |
| $C_4$'s | 2.63/1.81 |
| $C_5$'s | 3.88/2.90 |
| $C_6$-180°F. | 2.61/2.07 |
| 180–330°F. | 5.16/4.39 |
| 330°F.+ | 87.57/88.78 |
| Total | 101.85/100.42 |
| 330°F+ Gas Oil Properties | |
| Gravity, °API | 30.9 |
| Pour Point, °F. | −5 |

EXAMPLES 19–30

The ZSM-5 catalyst utilized in Examples 1 – 18 was hydrogen reactivated at a temperature of about 900°F. and a pressure of about 400 psig, for a period of about 24 hours. Following such a reactivation, the catalyst was contacted with a 645° – 750°F. Arabian Light fraction having properties listed in Table 2. Product volumes were determined as in Examples 1 – 18, and these results are tabulated in Table 2.

Again, as in Examples 1 – 18, the process conditions of pressure, space velocity and gas recycle were held relatively constant, while the temperature was gradually increased in order to maintain a 330°F.+ product pour point of 0°F. or less.

TABLE 2

| Example No. | 645/750 Arab Light | 19 | 20 |
|---|---|---|---|
| Process conditions | | | |
| Press. psig. | | 400 | 400 |
| LHSV, v/v/hr | | 1.42 | 1.46 |
| Gas Recyc., SCF/B | | 1563 | 1526 |
| Temp., °F. | | 614.5 | 619.6 |
| DOS, Total | | 198.7 | 199.7 |
| DOS, since Reg. | | 30.5 | 31.5 |
| $H_2$ Cons. SCF/B | | 94 | −5 |
| | | Yields:vol.%/wt.% | |
| $C_1$ | | 0.01 | 0.01 |
| $C_2$ | | 0.02 | 0.02 |
| $C_3$ | | 0.70 | 0.79 |
| $C_4$'s | | 4.05/2.67 | 4.28/2.82 |
| $C_5$'s | | 4.65/3.34 | 5.14/3.70 |
| $C_6$-180°F. | | 2.22/1.72 | 3.44/2.62 |
| 180–330°F. | | 7.78/6.49 | 7.81/6.57 |
| 330°F.+ | | 83.10/85.37 | 81.12/83.60 |
| Total | | 101.80/100.16 | 101.79/99.99 |
| 330°F+ Gas Oil Properties | Charge Stock | | |
| Gravity, °API | 27.8 | 23.3 | 23.6 |
| Pour Point, °F. | +55 | −20 | −25 |

TABLE 2-continued

| Example No. | 21 | 22 |
|---|---|---|
| Process conditions | | |
| Press. psig. | 400 | 400 |
| LHSV, v/v/hr | 1.45 | 1.44 |
| Gas Recyc., SCF/B | 1542 | 1533 |
| Temp., °F. | 624.9 | 629.6 |
| DOS, Total | 201.7 | 203.7 |
| DOS, since Reg. | 33.5 | 35.5 |
| $H_2$ Cons. SCF/B | −86 | −92 |
| | Yields:vol.%/wt.% | |
| $C_1$ | 0.01 | 0.01 |
| $C_2$ | 0.02 | 0.02 |
| $C_3$ | 0.81 | 0.80 |
| $C_4$'s | 4.30/2.83 | 4.79/3.16 |
| $C_5$'s | 5.08/3.65 | 5.14/3.70 |
| $C_6$-180°F. | 3.62/2.79 | 3.41/2.62 |
| 180–330°F. | 7.80/6.61 | 3.38/2.74 |
| 330°F.+ | 80.85/83.33 | 39.98/37.03 |
| Total | 101.65/99.85 | 101.69/99.84 |
| 330°F+ Gas Oil Properties | | |
| Gravity, °API | 24.2 | 24.5 |
| Pour Point, °F. | −20 | −20 |

| Example No. | 23 | 24 |
|---|---|---|
| Process conditions | | |
| Press. psig. | 400 | 400 |
| LHSV, v/v/hr | 1.47 | 1.40 |
| Gas Recyc.,SCF/B | 1456 | 1399 |
| Temp., °F. | 629.3 | 629.3 |
| DOS, Total | 205.7 | 207.7 |
| DOS, since Reg. | 37.5 | 39.5 |
| $H_2$ Cons. SCF/B | −105 | −133 |
| | Yields:vol.%/wt.% | |
| $C_1$ | 0.01 | 0.01 |
| $C_2$ | 0.02 | 0.02 |
| $C_3$ | 0.72 | 0.55 |
| $C_4$'s | 3.97/2.63 | 3.42/2.27 |
| $C_5$'s | 4.91/3.54 | 4.76/3.43 |
| $C_6$-180°F. | 3.37/2.57 | 3.42/2.62 |
| 180–330°F. | 3.56/3.25 | 3.73/3.04 |
| 330°F.+ | 85.81/87.34 | 86.11/88.09 |
| Total | 101.62/99.82 | 101.44/99.77 |
| 330°F+ Gas Oil Properties | | |
| Gravity, °API | 23.7 | 24.9 |
| Pour Point, °F | −5 | −25 |

| Example No. | 25 | *26 |
|---|---|---|
| Process conditions | | |
| Press. psig. | 400 | 400 |
| LHSV, v/v/hr | 1.53 | 1.51 |
| Gas Recyc.,SCF/B | 1306 | 1423 |
| Temp., °F. | 630.9 | 640.8 |
| DOS, Total | 209.0 | 211.0 |
| DOS, since Reg. | 40.8 | 42.8 |
| $H_2$ Cons. SCF/B | −75 | −51 |
| | Yields:vol.%/wt.% | |
| $C_1$ | 0.01 | 0.01 |
| $C_2$ | 0.02 | 0.02 |
| $C_3$ | 0.72 | 0.60 |
| $C_4$'s | 4.17/2.76 | 3.66/2.42 |
| $C_5$'s | 4.50/3.24 | 4.87/3.51 |
| $C_6$-180°F. | 3.39/2.60 | 3.69/2.83 |
| 180–330°F. | 5.30/4.40 | 6.72/5.61 |
| 330°F.+ | 83.55/86.05 | 82.75/85.09 |
| Total | 100.91/99.87 | 101.69/99.91 |
| 330°F+ Gas Oil Properties | | |
| Gravity, °API | 24.0 | 23.7 |
| Pour Point, °F | +10 | −20 |

| Example No. | 27 | 28 |
|---|---|---|
| Process conditions | | |
| Press. psig. | 400 | 400 |
| LHSV, v/v/hr | 1.44 | 1.41 |
| Gas Recyc.,SCF/B | 1462 | 1504 |
| Temp., °F. | 640.5 | 640.0 |
| DOS, Total | 213.0 | 215.0 |
| DOS, since Reg. | 44.8 | 46.8 |
| $H_2$ Cons. SCF/B | −77 | −64 |

TABLE 2-continued

| Example No. | 27 | 28 |
|---|---|---|
| | Yields:vol.%/wt.% | |
| C₁ | 0.01 | 0.00 |
| C₂ | 0.02 | 0.02 |
| C₃ | 0.81 | 0.74 |
| C₄'s | 4.74/3.14 | 4.15/2.75 |
| C₅'s | 4.94/3.56 | 4.97/3.59 |
| C₆-180°F. | 3.79/2.92 | 3.25/2.57 |
| 180–330°F. | 3.09/2.51 | 2.96/1.98 |
| 330°F.+ | 89.98/87.08 | 86.75/88.99 |
| Total | 101.53/99.87 | 101.68/99.89 |
| 330°F+ Gas Oil Properties | | |
| Gravity, °API | 24.6 | 24.8 |
| Pour Point, °F | −20 | −15 |

*High Loss in Distillation (8.2 wt.%)

Analysis of the data of Tables 1 and 2 illustrate several unexpected and novel results. Table 1 shows that when the entire 470°–730°F fraction was treated with the ZSM-5 catalyst, the hydrogen consumption level was generally 100–300 SCF/bbl. However, when only the heavier 645°–750°F fraction was contacted with the ZSM-5 under similar hydrodewaxing conditions, there was on average no hydrogen consumption, and in fact, a net hydrogen make was observed. Although a freshly hydrogen reactivated catalyst may induce the consumption of some hydrogen for the first day or two on stream when dewaxing in a practiced according to this invention, this consumption then disappears and may even be replaced by a net make of hydrogen, as will be illustrated in the examples.

The advantages of such an observance are substantial. Not only are the hydrogen costs of treating the entire 470°–730°F fraction converted into a cost advantage when treating only the heavier 645°–750°F stream, but the processing unit size and its attendant auxiliary equipment required is reduced due to the lower volume throughput.

Figure 2:
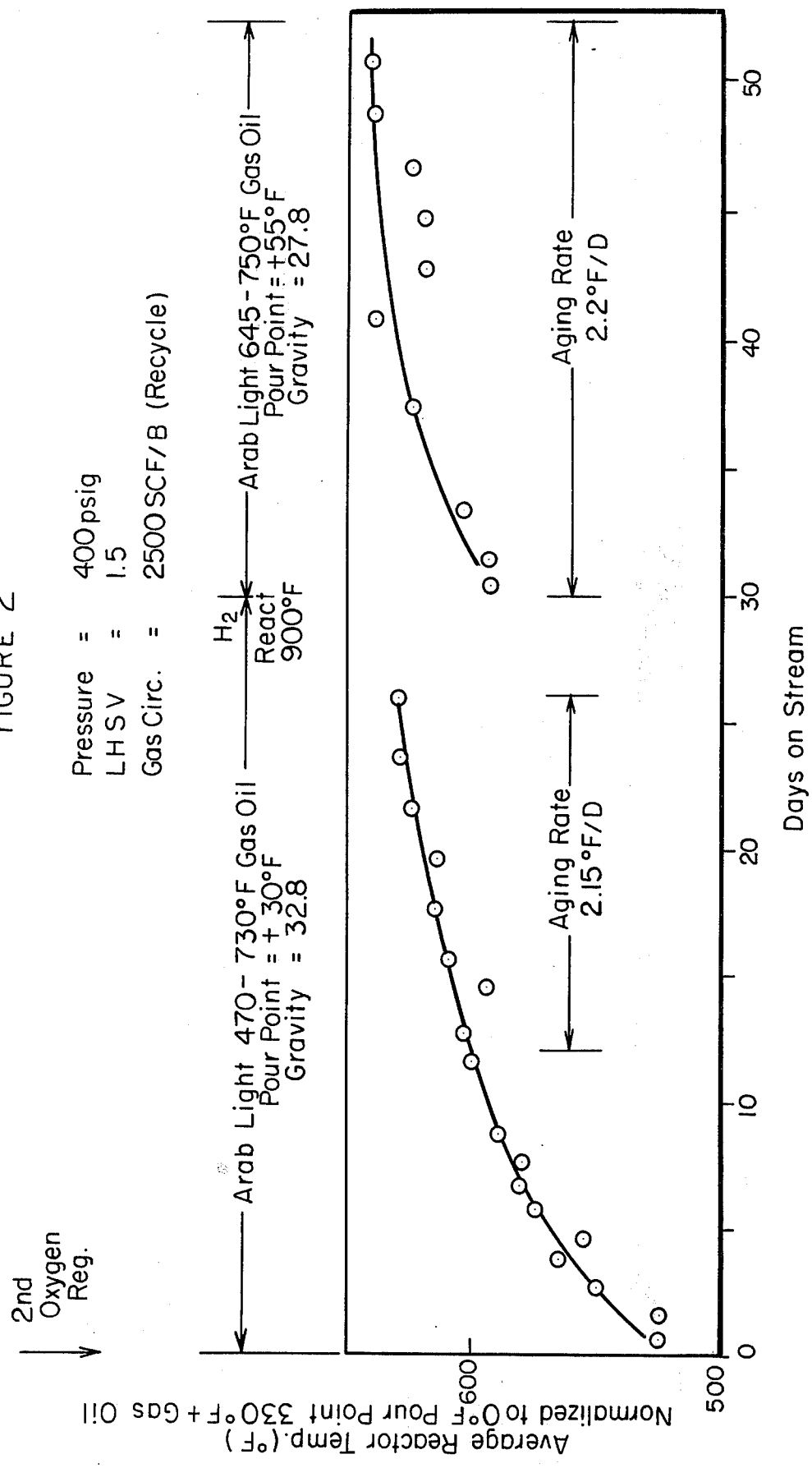
FIG. 2 is a catalytic aging curve.

As the bulk of the long chain paraffins which produce high pour point are contained in the heavier 645°–750°F fraction of the Arabian Light stock (the 470°–645°F fraction having an untreated pour point of about 0°F), one would expect that the catalyst activity would decrease more rapidly when only the heavy 645°–750°F fraction was treated as compared to the activity of the catalyst which treated the entire 470°–730°F range fraction. However, examination of Tables 1 and 2 show that in order to compensate for the activity decrease for the ZSM-5 type catalyst treating the 470°–730°F fraction the temperature was increased at a normalized aging rate of approximately 2.15°F/day. When treating the heavier 645°–750°F fraction the normalized aging rate was an almost identical 2.2°F/day. A comparison of these aging rates are shown in FIG. 2.

Figure 3:
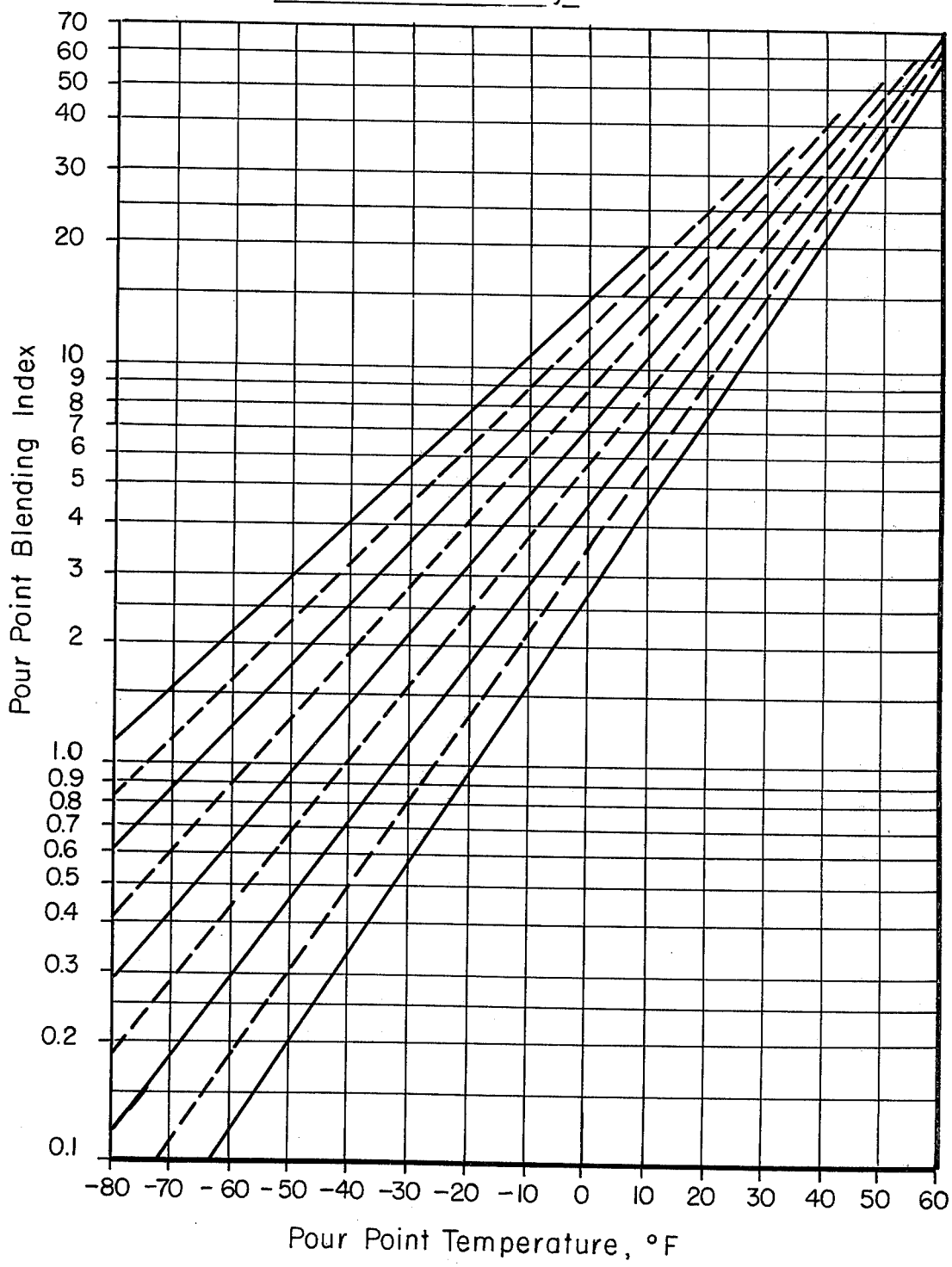
FIG. 3 is a pour point blending chart.

As the end point of 650°F minus is selected so as to produce a 0°F pour point, and the 650°F plus fraction is treated so as to produce a 0°F pour point, the pour point of the combination of the two is obviously 0°F pour. However, it is contemplated that the heavy fraction might be treated to a pour different from that of the untreated lighter fraction. The determination of the resultant non-linear pour point of the combination of two dissimilar pour point components is discussed in "Estimating Pour Points of Petroleum Distillate Blends" by Reid and Allen, Petroleum Refiner Vol. 30, No. 5 at pp. 93–95. The authors describe the curve which is referred to herein as FIG. 3 as follows.

The ordinate scale is numbered with an arbitrary "blending index" but it has the physical significance of equivalent wax concentration. The parameter which adequately describes the nature of the stock was found to be simply the ASTM distillation 50 percent temperature. This characteristic apparently does two things: (1) it reflects the molecular weight of the solvent and (2) the degree of imperfection of the wax solution. Actually, if perfect solutions were formed and concentrations were considered on a molar basis, there would be only a single line on FIG. 3. The crude source was found to be unimportant as a parameter, and this is to be expected from the work of Berne-Allen who showed that the solubility of wax in paraffinic solvents was of the same order of magnitude as in aromatic solvents when considered on a molar basis.

The blending index for each component is found which corresponds to its pour point and ASTM 50 percent temperature. The index of the blend is then found by taking a volumetric weighted arithmetic average (linear blending) of the indices of the components. The pour point corresponding to this index is found from the chart or table at the 50 percent temperature of the blend. The blend 50 percent temperature is satisfactorily found by taking the volumetric weighted average of the 50 percent temperatures of the components. The method is applicable to any number of components.

What is claimed is:

1. In the method for catalytically hydrodewaxing a petroleum distillate by contact of said distillate and hydrogen with a ZSM-5 type catalyst, the improvement which comprises: fractionating said distillate into a high pour-point stream having a four point greater than about 30°F and a low pour-point stream having a pour point less than about 30°F; hydrodewaxing said high pour point stream with said ZSM-5 type catalyst at a temperature of about 500°F to 850°F, a liquid hourly space velocity of about 0.5 to 10 LHSV, and a hydrogen pressure of about 100 to 1,500 p.s.i.g., whereby there is no consumption of hydrogen; and combining the hydrodewaxed stream with said low pour-point stream.

2. The method as claimed in claim 1 wherein said distillate has an endpoint of about 750° to about 900°F.

3. In the method for catalytically hydrodewaxing a petroleum distillate by contact of said distillate and hydrogen with a ZSM-5 type catalyst, the improvement which comprises: fractionating said distillate into a lower pour distillate and a higher pour distillate at a cut point of about 550° to 750°F; hydrodewaxing said higher pour distillate with said ZSM-5 type catalyst at a temperature of about 500°F to 850°F, a liquid hourly space velocity of about 0.5 to 10 LHSV, and a hydrogen pressure of about 100 to 1,500 p.s.i.g., whereby there is no consumption of hydrogen; and combining the ZSM-5 hydrodewaxed stream with said lower pour distillate.

4. The method as claimed in claim 3 wherein the hydrodewaxing conditions comprise the following: a hydrogen pressure of about 300 to 800 psig, a temperature of about 550° to 800°F and a space velocity of about 0.75 to 5 LHSV.

5. The method as claimed in claim 3 wherein said petroleum distillate has an endpoint of about 800°F.

6. The improved method of claim 1 wherein said ZSM-5 type catalyst is ZSM-5.

7. The improved method of claim 3 wherein said ZSM-5 type catalyst is ZSM-5.

* * * * *

UNITED STATES PATENT AND TRADEMARK OFFICE
CERTIFICATE OF CORRECTION

PATENT NO. : 3,956,102

DATED : May 11, 1976

INVENTOR(S) : Nai Yuen Chen, Bernard M. Gillespie, Henry R. Ireland and Thomas R. Stein It is certified that error appears in the above-identified patent and that said Letters Patent are hereby corrected as shown below:

| | |
|---|---|
| Col. 3, line 16 | After word "units", the word "of" should be -- or -- |
| Col. 4, line 61 (Table I, Example 3) | In line beginning with "$H_2$ Cons.", cancel the number -- 10 -- |
| Col. 9, line 29 | After the word "dewaxing", "in a" should be -- is -- and "a" should be omitted. (Should read -- dewaxing is practiced --) |
| Column 10, line 35 | "four" should be -- pour -- |

Signed and Sealed this

Eighth Day of March 1977

[SEAL]

Attest:

RUTH C. MASON
*Attesting Officer*

C. MARSHALL DANN
*Commissioner of Patents and Trademarks*